United States Patent
Honnorat

(10) Patent No.: US 11,097,833 B2
(45) Date of Patent: Aug. 24, 2021

(54) POWER-ASSISTED AIRCRAFT CRANK DEVICE, AND AN AIRCRAFT

(71) Applicant: AIRBUS HELICOPTERS, Marignane (FR)

(72) Inventor: Olivier Honnorat, Aix en Provence (FR)

(73) Assignee: AIRBUS HELICOPTERS, Marignane (FR)

(*) Notice: Subject to any disclaimer, the term of this patent is extended or adjusted under 35 U.S.C. 154(b) by 41 days.

(21) Appl. No.: 16/802,941

(22) Filed: Feb. 27, 2020

(65) Prior Publication Data
US 2020/0269969 A1 Aug. 27, 2020

(30) Foreign Application Priority Data
Feb. 27, 2019 (FR) ...................................... 1902026

(51) Int. Cl.
*B64C 13/30* (2006.01)
*B64C 13/18* (2006.01)
(Continued)

(52) U.S. Cl.
CPC .............. *B64C 13/30* (2013.01); *B64C 13/18* (2013.01); *B64C 13/50* (2013.01); *B64C 27/04* (2013.01); *F16C 3/22* (2013.01)

(58) Field of Classification Search
CPC ......... B64C 13/30; B64C 13/18; B64C 13/50; B64C 27/04; B64C 27/59; B64C 27/605; B64C 13/36; B64C 13/02; F16C 3/22
See application file for complete search history.

(56) References Cited

U.S. PATENT DOCUMENTS 4,533,096 A * 8/1985 Baker ..................... B64C 13/30
244/75.1
10,246,178 B2 * 4/2019 Elliott ..................... B64C 13/28
(Continued)

FOREIGN PATENT DOCUMENTS

EP    2266878 A1    12/2010
EP    3330177 A1    6/2018
(Continued)

OTHER PUBLICATIONS

French Search Report for French Application No. FR 1902026, Completed by the French Patent Office, dated Jan. 10, 2020, 8 pages.

*Primary Examiner* — Assres H Woldemaryam
(74) *Attorney, Agent, or Firm* — Brooks Kushman P.C.

(57) ABSTRACT

A crank device provided with an upstream lever and with a downstream lever. The crank device includes a phase shifter system connected to the upstream lever and to the downstream lever so that movement in rotation of the upstream lever about an axis of rotation induces movement in rotation of the downstream lever about the axis of rotation, the phase shifter system comprising a linear actuator mechanism carried by the upstream lever, the linear actuator mechanism having an outlet rod, the outlet rod having only one degree of freedom of movement in translation relative to the upstream lever, the outlet rod being connected via an outlet helical connection to the downstream lever so that movement in translation of the outlet rod generates movement in rotation of the downstream lever about the axis of rotation.

16 Claims, 2 Drawing Sheets

(51) Int. Cl.
*B64C 13/50* (2006.01)
*B64C 27/04* (2006.01)
*F16C 3/22* (2006.01)

(56) References Cited

U.S. PATENT DOCUMENTS

| | | | |
|---|---|---|---|
| 2009/0317252 A1* | 12/2009 | Garcin | B64C 13/30 |
| | | | 416/114 |
| 2011/0031346 A1 | 2/2011 | Allieta et al. | |
| 2012/0080557 A1* | 4/2012 | Rodrigues | F16H 25/20 |
| | | | 244/99.3 |
| 2012/0255386 A1 | 10/2012 | Couderc et al. | |
| 2018/0148167 A1 | 5/2018 | Bihel et al. | |
| 2019/0063568 A1* | 2/2019 | Laskovy | F16H 25/2204 |

FOREIGN PATENT DOCUMENTS

| | | | |
|---|---|---|---|
| FR | 2931132 A1 | 11/2009 | |
| FR | 2973775 A1 | 10/2012 | |

\* cited by examiner

POWER-ASSISTED AIRCRAFT CRANK DEVICE, AND AN AIRCRAFT

CROSS-REFERENCE TO RELATED APPLICATIONS

This application claims priority to French patent application No. FR 19 02026 filed on Feb. 27, 2019, the disclosure of which is incorporated in its entirety by reference herein.

BACKGROUND OF THE INVENTION

(1) Field of the Invention

The present invention relates to a power-assisted crank device, e.g. for a system for piloting an aircraft, and the present invention also relates to an aircraft.

(2) Description of Related Art

The invention is thus situated in the narrow field of control systems for controlling aircraft, or indeed rotorcraft, in particular because of the specificities encountered in the field of aviation.

For example, a helicopter commonly has a main lift and forward propulsion rotor that is provided with a plurality of blades that describe a cone. This general lift generated by the main rotor can then be resolved into a vertical lift force and a horizontal force that drives the helicopter in translation. Consequently, the main rotor does indeed provide lift and forward propulsion for the helicopter.

Furthermore, by controlling the shape and the angle of inclination of said cone relative to a frame of reference of the helicopter, a pilot can direct the helicopter accurately. In order to enable action to be taken on the cone, the helicopter is provided with specific means for the purpose of varying the pitch of each blade, and with controls, in particular flight controls that can be operated by a pilot.

Thus, when the pilot operates a first flight control, the pilot orders collective variation in pitch, i.e. pitch variation that is identical for all of the blades, so as to cause the magnitude of the general lift from the main rotor to vary in such a manner as to control the altitude and the speed of the helicopter. The first flight control may take the form of a collective pitch lever or of equivalent means.

Furthermore, in order to modify the axis of the general lift generated by the main rotor, it is appropriate to tilt said cone by causing pitch to vary in a manner that is not collective, but rather that is cyclic. Under such circumstances, the pitch of a blade varies as a function of its azimuth angle, and during one complete revolution it passes through a maximum value and a minimum value that occur at different azimuth angles.

By causing the pitch of the blades to vary cyclically, by using a second flight control, e.g. a cyclic stick or equivalent means, the pilot thus controls the "attitude" of the aircraft and movement in translation of the aircraft.

For this purpose, the flight controls of the pilot are connected to the blades via mechanical systems sometimes known as "linkages". Such a linkage may comprise at least one connecting rod or link, at least one "deflector" or "crank" means, a combiner, a phase shifter, servo-controls, a set of cyclic swashplates, etc.

In addition, the aircraft may have an autopilot system. In order to stabilize the aircraft, the autopilot system may have at least one fast, low-authority actuator that is placed in series in a flight control linkage. Such an actuator is sometimes referred to as a "series actuator" because of its location. Each series actuator is controlled by a computer that stabilizes the helicopter by extending or retracting the actuator, i.e. lengthening or shortening it, at a high frequency and transparently for the pilot, in order to act rapidly on the pitch of the blades. The order or instruction given by each series actuator is superposed on the movements of the linkage that carries it. The series actuator can be anchored by a parallel actuator or indeed by a system generating friction upstream of the series actuator. Such a parallel actuator is sometimes referred to as a "trim actuator" and is usually in the form of a slow, high-authority actuator.

A series actuator can be positioned on a connecting rod or link of a linkage, and is connected to the computer via an electrical harness.

Although satisfactory, such an architecture can suffer from various drawbacks.

A series actuator moves, de facto, in translation when the corresponding flight control is operated by a pilot or by a trim actuator. Consequently, the electrical harness must tolerate such a movement over the entire amplitude of movement of the flight control. The electrical harness is therefore dimensioned so as not to hinder the movements of the linkage in question and of the associated series actuator. In practice, the electrical harness can have a maximized length, which tends to generate excessive weight. In addition, the end of the harness that leads to the series actuator can be made softer or more flexible in order to allow it to deform while the series actuator is moving.

Furthermore, a series actuator can extend vertically. The series actuator or the harness connected to the series actuator can then have a first weight member that unbalances the flight control connected to said series actuator. A second weight member that can have a large weight can then be arranged, for example, on a foot of the flight control by way of compensation.

In summary, arranging a series actuator on a linkage that connects a flight control to a rotor can induce arranging friction members and/or specific harnesses and/or compensatory weight members.

Document FR 2 931 132 discloses an electrical power assistance system that does not solve those problems.

Documents FR 2 973 775, EP 3 330 177, and EP 2 266 678 are also known.

BRIEF SUMMARY OF THE INVENTION

An object of the present invention is to propose an innovative crank device so as to tend to enable the above-mentioned drawbacks to be overcome.

Such a crank device is provided with an upstream lever and with a downstream lever.

In addition, the crank device includes a phase shifter system connected to the upstream lever and to the downstream lever so that movement in rotation of the upstream lever about an axis of rotation induces movement in rotation of the downstream lever about said axis of rotation, the phase shifter system comprising a linear actuator mechanism carried by the upstream lever, said linear actuator mechanism having an outlet rod, said outlet rod having only one degree of freedom of movement in translation relative to the upstream lever, said outlet rod being connected via an outlet helical connection to the downstream lever so that movement in translation of the outlet rod generates movement in rotation of the downstream lever about said axis of rotation relative to the upstream lever.

The expression "actuator mechanism" and the expression "actuator" as used in the context of this invention each designate a mechanical, electric, pneumatic, hydraulic or other device that is suitable for moving a mechanical part relative to another mechanical part.

The upstream lever and the downstream lever are mounted to move in rotation together about an axis of rotation when the upstream lever is moved in rotation about said axis of rotation. In addition, the downstream lever has freedom of movement in rotation about the axis of rotation relative to the upstream lever on being controlled by the phase shifter system.

Therefore, movement in rotation of the upstream lever, as induced by movement of a control, can cause movement in rotation of the downstream lever about the axis of rotation via the phase shifter system. Indeed, movement in rotation of the upstream lever can cause movement in rotation of the outlet rod, which induces the same movement in rotation of the downstream lever.

Furthermore, the linear actuator mechanism located on the upstream lever represents an actuator arranged in series between the upstream lever and the downstream lever, such an actuator being termed, in conventional manner, a "series actuator". Said linear actuator mechanism may be controlled by a computer, directly or indirectly, so that it moves the downstream lever in rotation relative to the upstream lever by moving the outlet rod in translation. In this embodiment, the phase shifter system acts as an angular phase shifter between the upstream lever and the downstream lever.

Thus, on an aircraft, and in particular on a linkage interposed between a flight control suitable for being operated by a human pilot and an aerodynamic member such as, for example, a blade, the crank device enables a movement order transmitted by the human pilot to the upstream lever to be superposed with a stabilization order generated by an autopilot and transmitted to the downstream lever via the linear actuator mechanism. The angular phase shift imparted by the linear actuator mechanism is transparent for the pilot.

This particular location of the linear actuator makes it possible to obtain a crank device provided internally with a series actuator that does not move in translation, unlike in some prior art in which the series actuator is moved in translation by a connecting rod. Therefore, the invention does not necessarily involve using an electrical harness that is suitable for being deformed or moved so as to tolerate movement in translation of the linear actuator mechanism forming such a series actuator. Furthermore, in such a situation, the linear actuator mechanism is then not necessarily arranged vertically and does not necessarily involve using compensatory weights.

Therefore, a crank device of the invention can tend to simplify incorporation of a series actuator, in particular into a flight control linkage for controlling the flight of a rotorcraft.

In addition, this crank device may have one or more of the following characteristics.

In a first embodiment of the linear actuator mechanism, said linear actuator mechanism may comprise a linear actuator provided with the outlet rod.

For example, the linear actuator mechanism may take the form of an electric actuator, or indeed of a hydraulic or pneumatic actuator provided with two hydraulic or pneumatic chambers separated by the piston. The chambers are fed with liquid or gas by a distributor that can be controlled by a computer.

In a second embodiment of the linear actuator mechanism, said linear actuator mechanism may further comprise an intermediate rotary actuator. Said intermediate rotary actuator includes an intermediate rod that is mounted to move in rotation, e.g. about the axis of rotation.

Independently of this aspect, the intermediate rod is connected to the outlet rod via a system for transforming movement in rotation into movement in translation.

The expression "intermediate rotary actuator" designates, for example, an electric, pneumatic, or hydraulic actuator that is interposed between the upstream lever and the downstream lever and that has a work rod that is referred to as an "intermediate rod" and that is mounted to move in rotation.

For example, the intermediate rotary actuator comprises an intermediate body and an intermediate rotor, the intermediate rotor being mounted to move in rotation relative to the intermediate body, the intermediate rotor being constrained in rotation with the intermediate rod. The intermediate body may be secured to the upstream lever.

The expression "intermediate rotor" designates a rotary member of the linear actuator mechanism, the term "intermediate" being used to distinguish this rotor from any other rotor of the crank device. Similarly, the body of the intermediate rotary actuator is termed "intermediate" to distinguish it from any other body.

In an intermediate rotary actuator of the rotary electric motor type, the intermediate body may comprise an intermediate stator facing the intermediate rotor, the intermediate stator and the intermediate rotor being of a type that is conventional in an electric motor.

Optionally, the system for transforming movement in rotation into movement; in translation may include an inlet helical connection.

For example, said inlet helical connection has a thread pitch that is less than a thread pitch of the outlet helical connection. In an example, the inlet helical connection has a small pitch so that a large movement in rotation of the intermediate rod induces a small movement in translation of the outlet rod.

Optionally, the inlet helical connection comprises an inlet helical groove and an inlet stud that is disposed at least in part in the inlet helical groove, the inlet helical groove being carried by the outlet rod and the inlet stud being carried by the intermediate rod, or the inlet helical groove being carried by the intermediate rod and the inlet stud being carried by the outlet rod.

In another example, the inlet helical connection includes an intermediate nut that meshes with the intermediate rod, i.e. that co-operates with the intermediate rod, said intermediate nut being constrained in rotation with the upstream lever and being mounted to move in translation relative to the upstream lever, said intermediate nut being secured to the outlet rod. The intermediate nut may therefore have no degree of freedom of movement relative to the outlet rod.

The intermediate nut and the outlet rod may be formed integrally in one piece, or else the intermediate nut may be secured to the outlet rod via conventional means.

In order to prevent the intermediate nut from moving with the movement in rotation of the intermediate rotor, said intermediate nut is locked so as to be prevented from moving in rotation relative to the upstream Lever either directly or via the outlet rod, e.g. by means of a sliding connection.

Additionally or alternatively, the outlet rod itself may be constrained in rotation with the upstream lever, by an appropriate connection, and, for example, by a sliding connection, while being mounted to move in translation relative to the upstream lever.

Thus, at least the outlet rod or an intermediate nut secured to the outlet rod is connected to the upstream lever via at least one connection that constrains the upstream lever and the outlet rod to rotate together about the axis of rotation.

Said at least one connection may comprise a sliding connection including at least one spline channel, or a key.

The sliding connection may optionally be replaced with a sliding pivot connection or with a sphere-on-cylinder connection, or with two symmetrical sphere-on-plane connections.

In another aspect and in a first variant of the outlet helical connection, said outlet helical connection may include an outlet nut secured to the downstream lever, said outlet nut being provided with tapping that meshes with a complementary thread on said outlet rod.

The outlet nut and the downstream lever may be formed integrally in one piece, or else the outlet nut may be secured to the downstream lever via conventional means.

In this example, the outlet helical connection comprises a thread on the outlet rod that meshes with tapping in an outlet nut that is secured to the downstream lever.

In a second variant of the outlet helical connection, the outlet helical connection may comprise an outlet helical groove and an outlet stud of complementary shape that is disposed at least in part in the outlet helical groove, the outlet helical groove being carried by the outlet rod and the outlet stud being carried by the downstream lever, or the outlet helical groove being carried by the downstream lever and the outlet stud being carried by the outlet rod.

In this other example, the outlet helical connection may have a large pitch so that, a large movement, in translation of the outlet rod induces a small movement in rotation of the downstream lever, e.g. so that one centimeter of movement in translation of the outlet rod makes it possible to obtain one degree of rotation of the downstream lever. Such an outlet helical connection offers the advantage of being accurate.

In another aspect, the crank device may include a general rotary actuator, said general rotary actuator comprising a general rotor that is secured to the upstream lever, said general rotary actuator further comprising a general body that is secured to a stationary support.

The expression "general rotary actuator" designates an electric, pneumatic, or hydraulic actuator that is, for example, suitable for moving the upstream lever in rotation relative to a stationary support of the device or relative to a member of a vehicle, for example.

The expression "general rotor" designates a rotary member of said general rotary actuator, the term "general" being used to distinguish this rotor from any other rotor of the crank device. The general body may optionally be a stator of an electric general rotary actuator.

The general rotary actuator is then a trim actuator that is optionally connected in parallel with a flight control. When the general rotor moves in rotation, the entire linkage, optionally including the associated flight control, moves with it. The general rotary actuator may have high authority, i.e. be active over a large amplitude, but be slow, unlike the linear actuator mechanism, which may be fast and have low authority.

This configuration makes it possible to incorporate into a single crank device all of the functions of an autopilot system, namely a stabilization function via the linear actuator mechanism, and a trim function via the general rotary actuator. This facilitates installation on an aircraft and in particular on a rotorcraft because there are no longer dispersed units to be incorporated into each linkage.

In an aspect, the upstream lever may include an arm that extends radially from a hub, said hub being provided with a cavity, said linear actuator mechanism being arranged in said cavity at least in part.

This arrangement enables the linear actuator mechanism to be incorporated easily into the upstream lever.

In an aspect, said general rotor may optionally be fastened to the hub, at least one rolling bearing system being interposed between the hub and the stationary support.

For example, the hub comprises a cylinder that extends radially from an inside face to an outside face, the upstream lever and the general rotor being secured to the outside face, the inside face carrying the linear actuator mechanism.

Similarly, a rolling bearing system may be interposed between the downstream lever and a stationary structure.

In an aspect, the upstream lever and said downstream lever each have a single degree of freedom of movement, e.g. relative to a support of the device or to a load-bearing member of an aircraft, which single degree of freedom of movement is a degree of freedom of movement in rotation about said axis of rotation.

Conventional locking members, such as, for example, bearings, collars, or shoes may prevent the upstream lever and/or the downstream lever from moving in translation along said axis of rotation.

In an aspect, the crank device may include an autopilot computer configured to control the linear actuator mechanism directly or indirectly.

For example, the computer may control an electric linear actuator mechanism directly and electrically, or else it may control the linear actuator mechanism indirectly via a hydraulic/pneumatic system that is connected to an actuator of the hydraulic/pneumatic type.

The computer may optionally also be configured to control a general rotary actuator directly or indirectly.

In addition to a crank device, the invention also provides a control system, e.g. a control system for controlling an aerodynamic member, and optionally a blade.

A control system is provided with a control and with a mechanical member, optionally an aerodynamic mechanical member such as a blade or a flap, said control being suitable for being operated by a pilot, and said mechanical member having a position controlled by said control, said control system comprising a linkage connecting the control to the mechanical member.

The linkage then includes at least one crank device of the invention.

The crank device of the invention may, for example, be installed in the place of an existing crank device.

In addition to a crank device, the invention also provides an aircraft, and, for example, an aircraft having, in particular, a rotary wing.

Such an aircraft includes at least one crank device of the invention.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Three mutually orthogonal directions X, Y, and 2 are shown in some of the figures.

The first direction X is referred to as the "longitudinal" direction. The term "longitudinal" relates to any direction parallel to the first direction X.

The second direction Y is referred to as the "transverse" direction. The term "transverse" relates to any direction parallel to the second direction Y.

Finally, the third direction Z is said to be "in elevation". The term "in elevation" relates to any direction parallel to the third direction 2.

Figure 1:
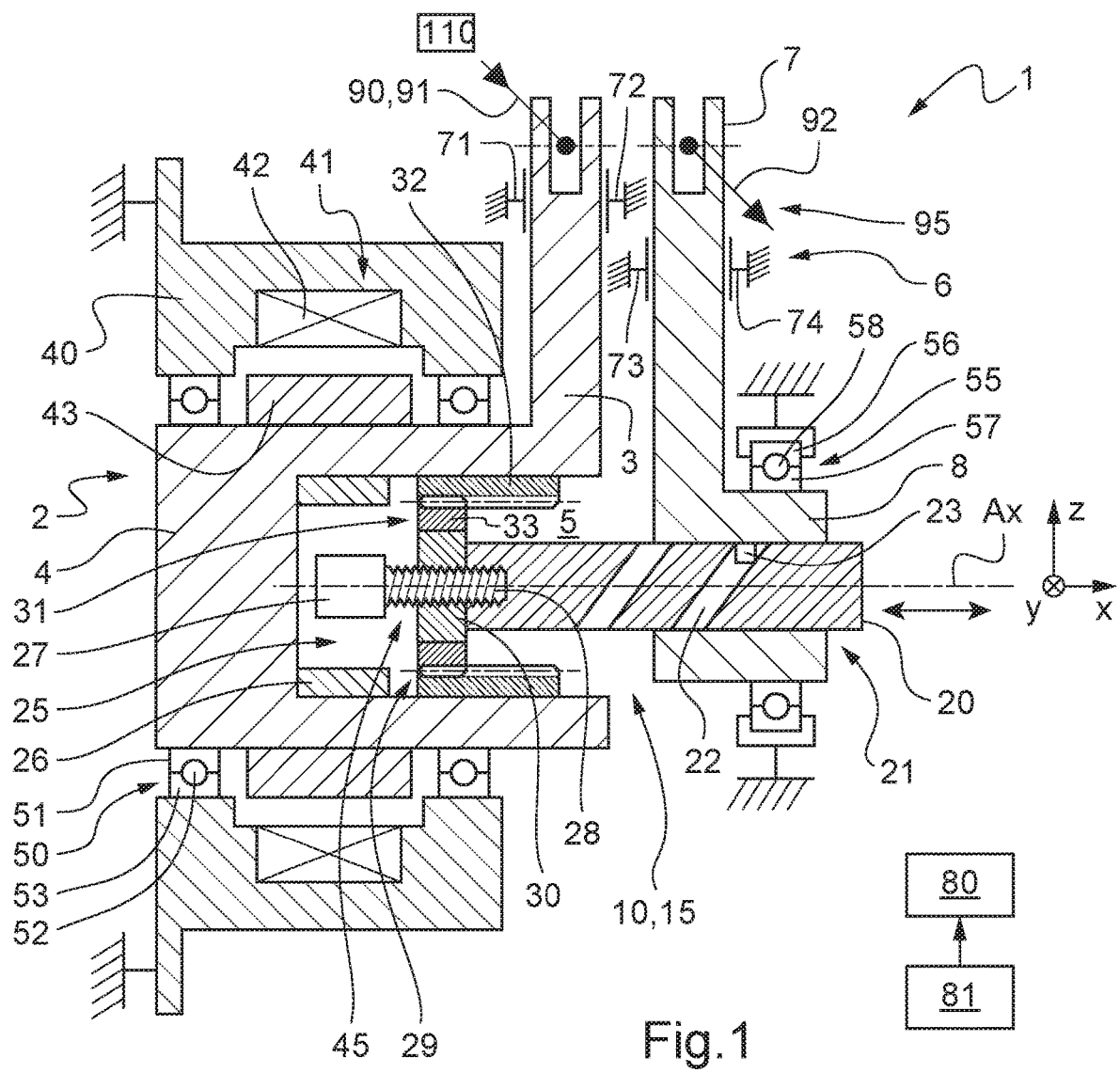
FIG. 1 is a view of a crank device having a rotary actuator.
Figure 3:
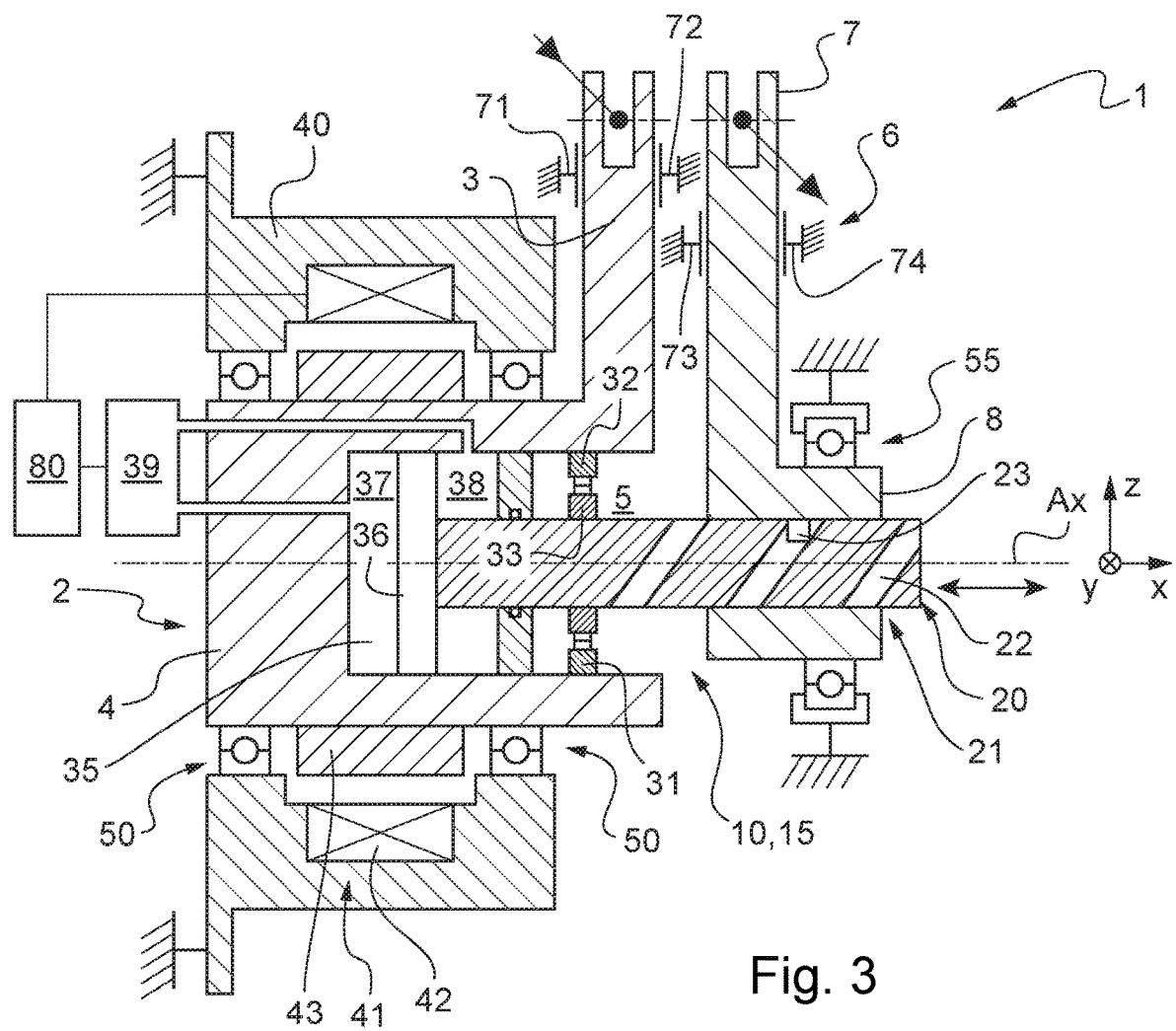
FIG. 3 is a view of a crank device having a linear actuator.

FIGS. 1 and 3 show a crank device 1 of the invention.

Independently of the embodiment, and with reference to FIG. 1, such a crank device 1 may, in particular, be arranged on a mechanical system or "linkage" 90, e.g. a flight control linkage, between a control 110 and a mechanical member 95 to be controlled. Such a crank device 1 may sometimes be referred to as a "bellcrank" by the person skilled in the art.

The crank device 1 has an upstream lever 2 provided with conventional means for being hinged to an upstream portion 91 of the linkage 90. Similarly, the crank device 1 has a downstream lever 6 provided with conventional means for being hinged to a downstream portion 92 of the linkage 90. The terms "upstream" and "downstream" refer to a direction in which an instruction to move propagates from the control 110 to the mechanical member 95 to be controlled.

The upstream lever 2 is mounted to move in rotation about an axis of rotation AX by conventional members.

Optionally, the upstream lever 2 has a single degree of freedom, namely only a degree of freedom of movement in rotation about the axis of rotation AX. Rolling bearing means 50 and/or locking members 71, 72 for locking in translation may be arranged conventionally for this purpose. Such a locking member may, for example, be in the form of a bearing, a collar, a shoe, a shoulder, etc.

For example, the upstream lever 2 may have an arm 3 integral with or secured to a hub 4, the arm 3 extending substantially radially from the hub 4 relative to the axis of rotation AX.

In addition, at least, one system of rolling bearings 50 may be arranged between the upstream lever 2 and a support 40 fastened to the device. For example, a system of rolling bearings 50 has an inner cage 51 secured to an outside face of the hub 4, an outer cage 53 secured to the support 40, and a plurality of balls 52 or equivalent means between the inner cage 51 and the outer cage 53.

Similarly, the downstream lever 6 is mounted to move in rotation about the same axis of rotation AX. The upstream lever 6 may have a single degree of freedom, namely only a degree of freedom of movement in rotation about the axis of rotation AX. Rolling bearing means 55 and/or locking means 73, 74 for locking in translation may be arranged conventionally for this purpose. Such a locking member may, for example, be in the form of a bearing, a collar, a shoe, a shoulder, etc. For example, the downstream lever 6 may have an arm 7 integral with or secured to a hub 8, the arm 7 extending substantially radially from the hub 3 relative to the axis of rotation AX.

In addition, at least one system of rolling bearings 50 may be arranged between the downstream lever 2 and a non-moving member. For example, a system of rolling bearings 55 has an inner cage 57 secured to an outside face of the hub 8, an outer cage 56 secured to the non-moving member, and a plurality of balls 59 or equivalent means between the inner cage 57 and the outer cage 56.

Optionally, the arm 3, the hub 4, the arm 7, and the hub 8 may be referred to as the upstream arm 3, the upstream hub 4, the downstream arm 7, and the downstream hub 8 so as to be distinguished from one another.

In addition, the downstream lever 6 is mounted to move in rotation both jointly with the upstream lever 2 and also relative to the upstream lever 2 about the axis of rotation AX. In particular, the upstream lever 2 moving in rotation about the axis of rotation AX causes the downstream lever 6 to move in rotation about the axis of rotation AX, but the downstream lever 6 has a degree of freedom of movement in rotation about the axis of rotation AX relative to the upstream lever 2.

For this purpose, the crank device 1 has a phase shifter system 10 interposed mechanically between the upstream lever 2 and the downstream lever 6. In particular, the phase shifter system IG serves firstly to cause the downstream lever 6 automatically to move in rotation about the axis of rotation AX when the upstream lever moves in rotation about said axis of rotation AX, and secondly, e.g. on request from a computer 80, to cause the downstream lever 6 to move in rotation about the axis of rotation AX relative to the upstream lever 2. Thus, movement of the upstream portion 91 of the linkage induces rotation of the upstream lever 2, that rotation of the upstream lever 2 generating rotation of the downstream lever 6 via the phase shifter system 10. In addition, the computer 80 can control the phase shifter system 10 to cause the downstream lever 6 to move in rotation about the axis of rotation AX without moving the upstream lever 2.

Said computer 80 is configured to control at least one phase shifter system 10 directly or indirectly. For example, the computer may control an electric phase shifter system 10 directly, or else it may control a distributor of a hydraulic or pneumatic phase shifter system 10 as shown in FIG. 3. To this end, the computer 80 may be connected to various sensors 81, and may apply conventional relationships. The computer 80 may, for example, comprise at least one processor and at least one memory, at least one integrated circuit, at least one programmable system, and/or at least one logic circuit, these examples not limiting the scope given to the expression "computer".

In addition, the phase shifter system 10 is provided with a linear actuator mechanism 15 controlled by a computer 80. The linear actuator mechanism 15 has a length that is variable along the axis of rotation AX, it then being possible for the linear actuator mechanism 15 to be retracted or extended at the request of the computer 80.

The linear actuator mechanism 15 is carried by an upstream lever 2. Said linear actuator mechanism 15 is provided with at least one member that is fastened by conventional means to the upstream lever 2. For example, the hub 4 may optionally be provided with a cavity 5 in which the linear actuator mechanism 25 is arranged at least in part.

Said linear actuator mechanism 15 is further provided with an outlet rod 20 that is mounted to move in translation along the axis of rotation AX while the linear actuator mechanism 15 is being extended or retracted. Said outlet rod 20 has at least one degree of freedom of movement relative to the upstream lever 2, namely at least a degree of freedom of movement in translation along the axis of rotation AX relative to the upstream lever 2.

Optionally, the outlet rod 20 has only one degree of freedom of movement relative to the upstream lever 2, namely said degree of freedom of movement in translation along the axis of rotation AX relative to the upstream lever 2.

Therefore, a movement in rotation of the upstream lever 2 about the axis of rotation AX induces a movement in rotation of the outlet rod 20 about the axis of rotation AX. In addition, the linear actuator mechanism 15 can move the outlet rod 20 in translation relative to the upstream lever 2 without having any effect on the position of said upstream lever 2.

In addition, the outlet rod 20 is connected via an outlet helical connection 21 to the downstream lever 6 so that a movement in translation of the outlet rod 20 generates a movement in rotation of the downstream lever 6 about the axis of rotation AX. The outlet, helical connection 21 may be a connection that is irreversible in that the outlet helical connection 21 may be dimensioned so that a movement in rotation of the downstream lever does not induce a movement in translation of the outlet rod 20. Such a connection may be dimensioned in conventional manner.

In a possibility, the outlet helical connection 21 may have an outlet helical groove 22 and an outlet stud 23 that co-operates with the outlet helical groove 22. Thus, the outlet stud 23 may be mounted to move in the outlet helical groove 22. Such an outlet helical connection 21 may have a large pitch, and for example, a pitch that is larger than a screw-and-nut system. Two configurations are possible: either the outlet helical groove 22 is provided in the outlet rod 20, and the outlet stud 23 extends radially from the downstream lever 6 to into the groove in the outlet rod 20, or else the outlet helical groove 22 is provided in a wall of the downstream lever 6, and the outlet stud 23 extends radially from the outlet rod 20 to into the outlet helical groove 22 in the downstream lever 6.

Figure 2:
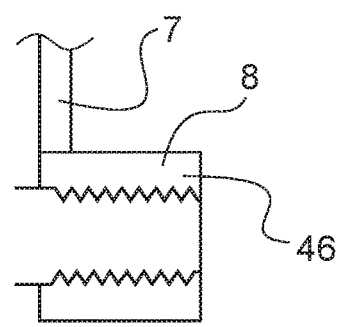
FIG. 2 is a fragmentary view of an outlet helical connection provided with a nut.

In the possibility shown in FIG. 2, the outlet helical connection 21 may include an outlet nut. 46 that is secured to the downstream lever 6. For example, the hub of the downstream lever 6 may have a screw-drive nut. The outlet nut 46 is then provided with tapping that meshes with a thread on the outlet rod 20 in such a manner as to form a screw-and-nut drive system.

In another aspect, the crank device 1 may have a trim actuator referred to as a "general rotary actuator" 41.

Such a general rotary actuator 41 comprises a rotor referred to for reasons of convenience as a "general rotor" 43, and a stator referred to for reasons of convenience as a "general body" 42. The general rotor 43 is then secured to the upstream lever 2, e.g. by being fastened to an outside face of the hub 4 of the upstream lever 2. The general body 42 is secured to a stationary support 40, the general rotor 43 being mounted to move in rotation relative to the general body 42 about the axis of rotation. For example, the general rotary actuator 41 may be a conventional brushed or brushless electric motor.

The general rotary actuator 41 may be activated to cause the general rotor 43 to move in rotation relative to the general body 42. That movement in rotation induces, de facto, a movement in rotation of the upstream lever 2 and therefore a movement in rotation of the downstream lever 6 about the axis of rotation AX via the phase shifter system 10.

Independently of whether or not there is a trim actuator, the linear actuator may comprise a linear or rotary actuator for causing the outlet rod to move in translation.

In the first embodiment shown in FIG. 1, the linear actuator mechanism 15 may include an intermediate rotary actuator 25, e.g. an electric intermediate rotary actuator 25.

The intermediate rotary actuator 25 is then provided with an intermediate body 26 secured to the upstream lever 2. For example, the intermediate body 26 is a stator of an electric motor and/or is fastened to the cavity 5 in the hub of the upstream lever 2.

The intermediate rotary actuator 25 is also provided with an intermediate rotor 27 that is mounted to move in rotation relative to the intermediate body 26 about the axis of rotation ax. The intermediate rotor 27 is then mechanically connected to the outlet rod 20 via a system 45 for transforming movement in rotation into movement in translation.

For example, the intermediate rotor 27 may be secured to or indeed integrated with an intermediate rod 28. Said intermediate rod 28 is connected to the outlet rod 20 via the system 45 for transforming movement in rotation into movement in translation through an inlet, helical connection 29 that is optionally irreversible. Said intermediate rod 28 is then mounted to move relative to the upstream lever 2 in rotation only, and is connected to the outlet rod 20 at least via an inlet helical connection 29. Said inlet helical connection 29 is dimensioned so that a movement in rotation of the intermediate rod 28 induces a movement in translation of the outlet rod. Optionally, the inlet helical connection 29 has a thread pitch less than a thread pitch of the outlet helical connection 21.

In the example shown, the intermediate rod 28 is a worm screw. The inlet helical connection 29 then includes an intermediate nut 30 having tapping that is meshed with a thread on the intermediate rod 28. The intermediate nut 30 is secured to or integral with the outlet rod 20. For example, the Intermediate nut 30 is fastened in conventional manner to the outlet rod 20 or represents a portion of the outlet rod 20.

The intermediate nut 30 and/or the outlet rod 20 are constrained in rotation with the upstream lever 2 about the axis of rotation AX by conventional means. In the example shown, a sliding connection 31 having fluting and splines 32/33 constrains the intermediate nut 30 and the upstream lever 2 in rotation with each other.

In other examples (not shown), a sliding connection having a key constrains the intermediate nut 30 and the upstream lever 2 to rotate together and/or a sliding connection having fluting and splines constrains the outlet rod 20 and the upstream lever 2 to rotate together and/or a sliding connection having a key constrains the outlet rod 20 and the upstream lever 2 to rotate together. In these various examples, the sliding connection may be replaced with a sliding pivot connection or with a sphere-on-cylinder connection, or with two symmetrical sphere-on-plane connections.

Movement in rotation of the upstream lever 2 then causes an optionally identical movement in rotation of the outlet rod 20, via the sliding connection 31 or an equivalent connection, or indeed via the intermediate nut 30, the outlet rod 20 inducing a movement in rotation of the downstream lever 6 via the outlet helical connection 21.

In addition, a movement in rotation of the intermediate rotor 27 induces a movement in rotation of the intermediate rod 28 and therefore a movement in translation of the intermediate nut 30 and of the outlet rod 20, the movement in translation of the outlet rod 20 inducing a movement in rotation of the downstream lever 6 via the outlet helical connection 21.

In the second embodiment shown in FIG. 3, the linear actuator mechanism 15 comprises a linear actuator 35 provided with the outlet rod 20.

In the example shown, a hydraulic or pneumatic linear actuator 35 has two chambers 37 and 38 having variable volumes and separated by a piston 36. The two chambers are connected to a hydraulic/pneumatic distributor 39 controlled by the computer 30. The piston 36 is then secured to or integral with the outlet rod 20.

As in the preceding embodiment, the outlet rod 20 and/or the piston 36 is/are connected to the upstream lever 2 via a sliding connection 31/sliding connections 31 or equivalent means.

Movement in rotation of the upstream lever 2 then causes movement in rotation of the outlet rod 20 via the sliding connection 31 or an equivalent connection, or indeed via the piston 36, the outlet rod 20 inducing a movement in rotation of the downstream lever 6 via the outlet helical connection 21.

In addition, movement in translation of the piston 36 induces movement in translation of the outlet rod 20, the movement in translation of the outlet rod 20 inducing movement in rotation of the downstream lever 6 via the outlet helical connection 23.

Figure 4:
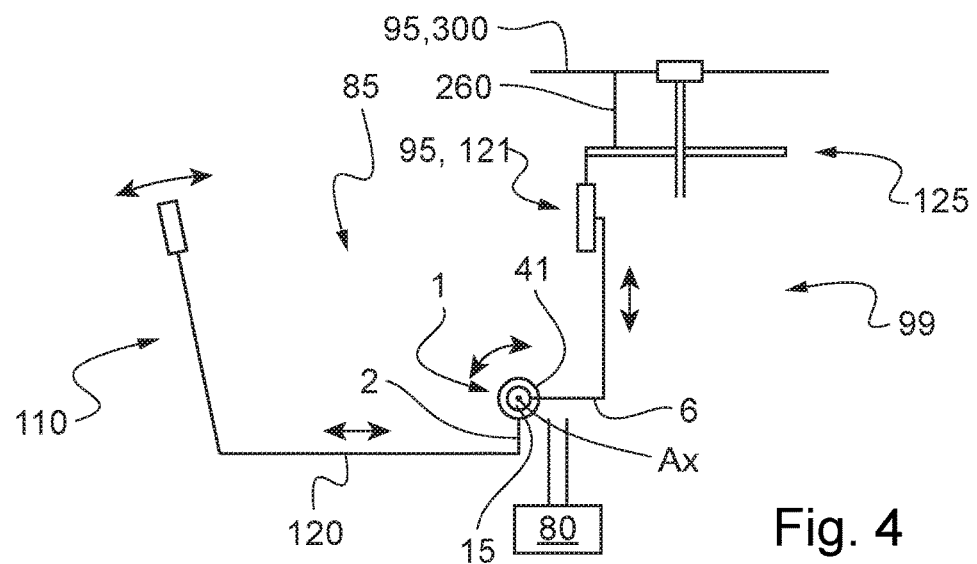
FIG. 4 is a diagram showing an example of an aircraft control system provided with a crank device.

FIG. 4 shows an example of a control system 85 provided with a crank device 1 interposed between a control 110 and a mechanical member 95, optionally on an aircraft 99. For example, such a control 110 may be in the form of a stick or of a lever, such as a cyclic stick or a collective pitch control lever that are used for controlling the pitch of the blades of a rotorcraft. Optionally, the mechanical member 95 may thus comprise an aerodynamic piloting member such as a blade 300 or a servo-control 121 suitable for changing the pitch of such a blade 300.

In the example given by way of illustration, the control is connected via at least one connecting rod 91, 120 to the upstream lever 2 of a crank device 1 of the invention. The downstream lever 6 is then connected via at least one connecting rod 92 to a servo-control 121. This servo-control 121 includes a moving body or a moving power rod that is hinged to a non-rotary swashplate of a set of cyclic swashplates 125. Said set of cyclic swashplates 125 further includes a rotary swashplate that is connected to a blade 300 at least via a pitch connecting rod 260.

The crank device 1 may optionally be arranged on a combiner.

In addition, the linear actuator mechanism 15 and optionally the general rotary actuator 41 of the crank device 1 are connected to respective ones of two harnesses that lead, in particular, to a computer 80.

Naturally, the present invention can be the subject of numerous variants as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. An aircraft crank device provided with an upstream lever and with a downstream lever,
   wherein the crank device includes a phase shifter system connected to the upstream lever and to the downstream lever so that movement in rotation of the upstream lever about an axis of rotation induces movement in rotation of the downstream lever about the axis of rotation, the phase shifter system comprising a linear actuator mechanism carried by the upstream lever, the linear actuator mechanism having an outlet rod, the outlet rod having only one degree of freedom of movement in translation relative to the upstream lever, the outlet rod being connected via an outlet helical connection to the downstream lever so that movement in translation of the outlet rod generates movement in rotation of the downstream lever about the axis of rotation relative to the upstream lever.

2. The aircraft crank device according to claim 1, wherein the linear actuator mechanism comprises a linear actuator provided with the outlet rod.

3. The aircraft crank device according to claim 1, wherein the linear actuator mechanism further comprises an intermediate rotary actuator, the intermediate rotary actuator including an intermediate rod that is mounted to move in rotation, the intermediate rod being connected to the outlet rod via a system for transforming movement in rotation into movement in translation.

4. The aircraft crank device according to claim 3, wherein the system for transforming movement in rotation into movement in translation includes an inlet helical connection.

5. The aircraft crank device according to claim 4, wherein the inlet helical connection includes an intermediate nut that meshes with the intermediate rod, the intermediate nut being constrained in rotation with the upstream lever and being mounted to move in translation relative to the upstream lever, the intermediate nut being secured to the outlet rod.

6. The aircraft crank device according to claim 1, wherein at least the outlet rod or an intermediate nut secured to the outlet rod is connected to the upstream lever via at least one connection that constrains the upstream lever and the outlet rod to rotate together about the axis of rotation.

7. The aircraft crank device according to claim 6, wherein the at least one connection comprises a sliding connection including at least one spline channel, or a key.

8. The aircraft crank device according to claim 1, wherein the outlet helical connection includes an outlet nut secured to the downstream lever, the outlet nut being provided with tapping that meshes with a complementary thread on the outlet rod.

9. The aircraft crank device according to claim 1, wherein the outlet helical connection comprises an outlet helical groove and an outlet stud of complementary shape that is disposed at least in part in the outlet helical groove, the outlet helical groove being carried by the outlet rod and the outlet stud being carried by the downstream lever, or the outlet helical groove being carried by the downstream lever and the outlet stud being carried by the outlet rod.

10. The aircraft crank device according to claim 1, wherein the crank device includes a general rotary actuator, the general rotary actuator comprising a general rotor that is secured to the upstream lever, the general rotary actuator further comprising a general body that is secured to a stationary support, the general rotor being mounted to move in rotation relative to the general body.

11. The aircraft crank device according to claim 1, wherein the upstream lever includes an arm that extends radially from a hub, the hub being provided with a cavity, the linear actuator mechanism being arranged in the cavity at least in part.

12. The aircraft crank device according to claim 11, wherein the crank device includes a general rotary actuator, the general rotary actuator comprising a general rotor that is secured to the upstream lever, the general rotary actuator further comprising a general body that is secured to a stationary support, the general rotor being mounted to move in rotation relative to the general body and wherein the general rotor is fastened to the hub, at least one rolling bearing system being interposed between the hub and the support.

13. The aircraft crank device according to claim 1, wherein the upstream lever and the downstream lever each have a single degree of freedom, which single degree of freedom is a degree of freedom of movement in rotation about the axis of rotation.

14. The aircraft crank device according to claim 1, wherein the aircraft crank device includes an autopilot computer configured to control the linear actuator mechanism directly or indirectly.

15. A control system provided with a control and with a mechanical member, the control being suitable for being operated by a pilot, and the mechanical member having a position controlled by the control, the control system comprising a linkage connecting the control to the mechanical member, wherein the linkage includes at least one aircraft crank device according to claim 1.

16. An aircraft, wherein the aircraft includes at least one aircraft crank device according to claim 1.

* * * * *